Sept. 2, 1924.
N. W. McLEOD
DEVICE FOR GUIDING EXPANSIBLE PACKING RINGS ONTO PISTONS
Filed Dec. 17, 1921
1,506,767
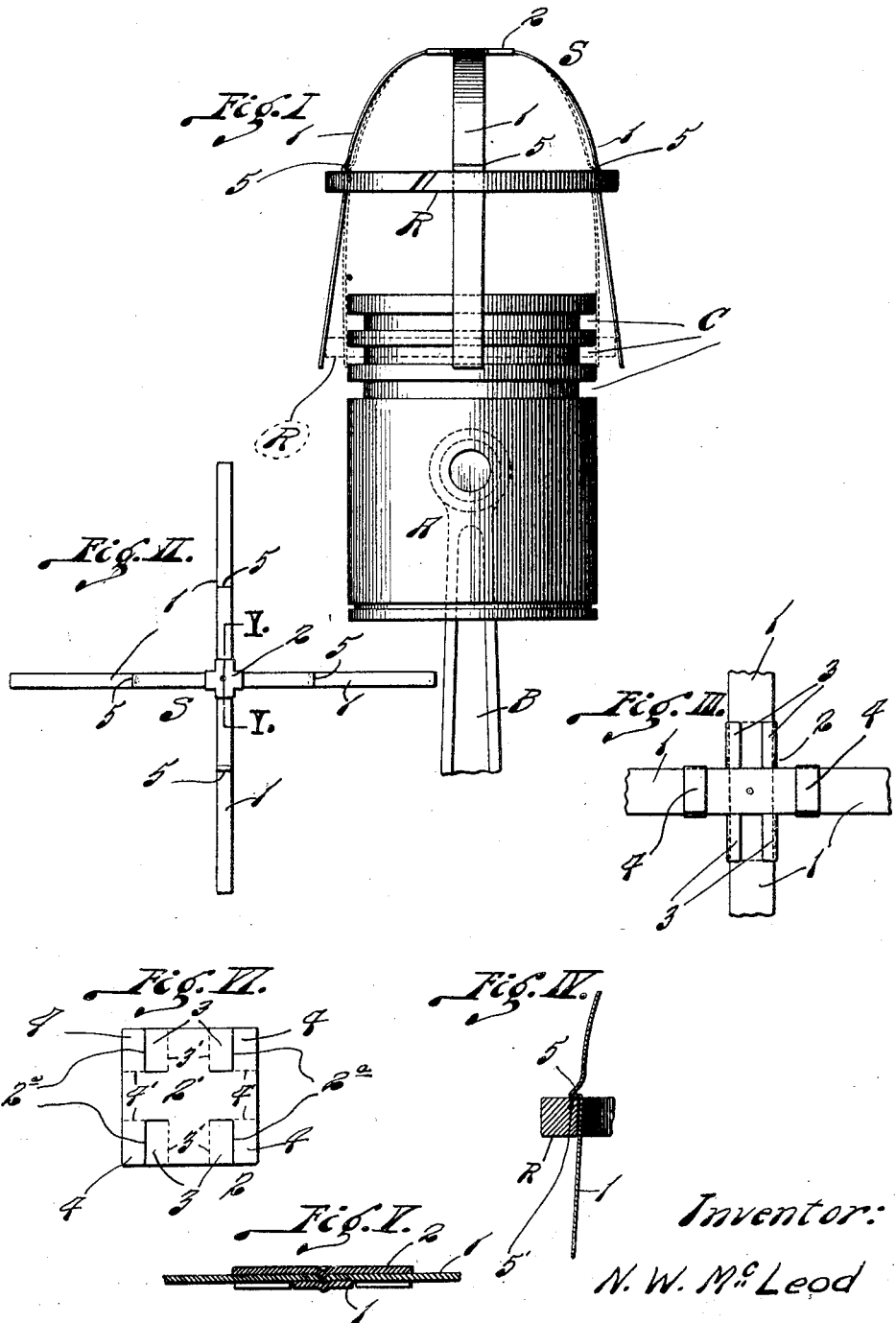
Inventor:
N. W. McLeod
By Cook & McCauley Attys Patented Sept. 2, 1924.

1,506,767

UNITED STATES PATENT OFFICE.

NELSON W. McLEOD, OF ST. LOUIS, MISSOURI, ASSIGNOR TO WALTER A. ZELNICKER SUPPLY COMPANY, OF ST. LOUIS, MISSOURI, A CORPORATION OF MISSOURI.

DEVICE FOR GUIDING EXPANSIBLE PACKING RINGS ONTO PISTONS.

Application filed December 17, 1921. Serial No. 523,231.

*To all whom it may concern:*

Be it known that I, NELSON W. McLEOD, a citizen of the United States of America, a resident of the city of St. Louis and State of Missouri, have invented certain new and useful Improvements in Devices for Guiding Expansible Packing Rings Onto Pistons, of which the following is a full, clear, and exact description, reference being had to the accompanying drawings, forming a part of this specification.

This invention relates to improvements in devices for guiding expansible packing rings onto pistons, and has for its object the production of a simple and inexpensive device which will eliminate much of the difficulty usually involved in forcing packing rings over the peripheral face of a piston and into the packing ring grooves.

Briefly stated, the preferred form of tne invention comprises a slide composed of a plurality of divergent resilient members which are secured together and adapted to embrace the end of the piston. By this arrangement a tapering approach is provided for the rings, which are passed over said slide at the narrow end thereof and forced toward the piston, so that when they reach said piston said rings have been sufficiently expanded to pass over the peripheral face thereof and will spring into the packing ring grooves in said piston.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is an elevation of a piston with my device in place thereon, a portion of the connecting rod, associated with said piston, being broken away.

Fig. II is a plan view of my guiding device.

Fig. III is an inverted fragmentary plan view showing the means for connecting the resilient slide members.

Fig. IV is a sectional detail showing one of the detents for retaining the packing rings on the slide.

Fig. V is an enlarged section on V—V in Fig. II.

Fig. VI is a plan of the connecting member before it has been bent to receive the resilient slide members.

For the purpose of illustrating my invention, I have shown a piston A provided with the usual connecting rod B and the usual packing ring grooves C for the reception of metallic expansible packing rings, one of which is designated by the reference character R.

S designates a tapering slide upon which the packing rings R are expanded to a sufficient degree to permit said packing rings to be passed over the peripheral face of the piston A. This slide comprises a pair of resilient members 1 secured together at their centers in a manner to be hereinafter described, the ends of said resilient members being adapted to lie adjacent to and embrace the end of the piston A, which receives the packing rings R (Fig. I). Each of the members 1 is preferably formed of a thin, flat strip of spring steel of sufficient stiffness to withstand the radial resistance of the packing rings as they are forced along the slide S.

2 designates a cross-shaped connecting member which serves as a means for connecting the resilient members and comprises a main body portion 2' (Fig. VI), having pairs of legs, each leg of one pair being provided with a pair of tongues 3 adapted to embrace one of the resilient members 1, and each leg of the other pair having a pair of overlapping tongues 4 adapted to embrace the other resilient member.

The connecting member 2, it will be observed by referring to Fig. VI, is formed from a single piece of metal which is approximately square and provided with a plurality of L-shaped slits $2^a$. To form said connecting member into the shape shown in Figs. II and III, the oppositely disposed tongues 3 are folded toward each other on dotted lines 3', and the oppositely disposed tongues 4 are folded on the dotted lines 4' to positions where they overlap each other. It is, of course, apparent that spaces equal to the thickness of the resilient members 1 are left between the body portion 2' of the connecting member and the inside faces of the folded tongues, and through these spaces said resilient members are passed; and because both of said resilient members enter said connecting member in the same horizontal plane, one of said resilient members will pass over the other, as is shown in Fig. III.

After the connecting member 2 has been located midway between the ends of the resilient members 1, said connecting member is struck a blow with a sharp tool, such as a punch, said blow being of sufficient force to form an indentation in said connecting member, and in each of the resilient members 1 (Fig. V) whereby said parts are rigidly locked together so that accidental displacement thereof is avoided. The lock just described does not prevent the device from being taken apart as the indentations are not of sufficient depth to form a positive lock, but only act as a means of preventing accidental displacement of the parts mentioned.

As an aid in retaining the packing ring on the slide S while said slide is being brought to the proper position relative to the piston A, I provide each of the resilient members 1 with a detent 5 which preferably has a flat, abrupt shoulder 5'. Said shoulder is formed by bending said resilient member in the manner shown in Fig. IV, whereby an integral, outwardly extending detent is formed.

The resilient slide shown by the drawings (Fig. II) is assembled in the form of a Greek cross comprising the central cross-shaped connecting member 2 and resilient legs radiating therefrom. The legs are formed by the resilient members 1 intersecting each other at the center of the cross where they are rigidly connected together.

The operation of my device is as follows:

The packing ring is placed in such position relative to the guiding device as to permit the operator to pass his hand through said packing ring, grasp the cross-shaped connecting member 2 and draw same therethrough, whereby the resilient members 1 will be bowed as shown in Fig. I. The resilient members 1 will be drawn through said packing ring until the detents 5 spring over the edge of said packing ring (Fig. I), thus preventing the packing ring from being accidentally discharged over the narrow end of said slide. When the packing ring is in the position just described, the end portions of the resilient members 1 diverge from the central connection and they can embrace the peripheral face of the piston. Assuming now that it is desired to place the packing ring in the packing ring groove farthest from the top of the piston, the slide will be positioned with the end portions of the resilient members 1 extending over the other grooves, and the ends of said resilient members adjacent to the lowermost groove, as shown in Fig. I. The packing ring may then be slid along the tapering slide S whereby it will be expanded a sufficient degree to pass over the peripheral face of the piston, and when it reaches the lowermost packing ring groove C it will spring into said groove. To place packing rings in the other packing ring grooves, it is only necessary to change the location of the ends of the resilient members 1 to a position adjacent to said grooves, and said packing rings may be guided in the manner just described.

I claim:

1. In a device for guiding expansible packing rings onto pistons, a slide comprising a central connection and normally straight resilient legs radiating from and rigidly connected by said central connection, said legs having free outer end portions capable of being bent when the device is in use to positions where they embrace the peripheral face of a piston and being adapted to return to their original positions after the packing ring has been located on said piston.

2. In a device for guiding expansible packing rings onto pistons, a slide comprising a plurality of resilient legs having free ends adapted to embrace the peripheral face of said piston, and means whereby a packing ring may be retained on said slide.

3. In a device for guiding expansible packing rings onto pistons, a slide comprising a plurality of resilient legs having free ends adapted to embrace the peripheral face of a piston, and retaining means comprising abutments on said resilient legs whereby a packing ring may be retained on said slide.

4. In a device for guiding expansible packing rings onto pistons, a slide comprising a plurality of resilient legs connected to each other, the ends of said resilient legs being adapted to embrace the peripheral face of a piston, and retaining means comprising outwardly extending detents formed on said legs to retain a packing ring on said slide.

5. In a device for guiding expansible packing rings onto pistons, a slide comprising a plurality of normally straight resilient members, and a connecting means having a plurality of legs, each of said legs having a pair of flexible tongues adapted to embrace one of said resilient members, and said resilient members having free end portions capable of being bent when the device is in use to positions where they embrace the peripheral face of a piston and being adapted to return to their original positions after the packing ring has been located on said piston.

6. In a device for guiding expansible packing rings onto pistons, a slide comprising a plurality of normally straight resilient members, and a connecting means having pairs of legs, each leg of one pair being provided with tongues adapted to embrace the margins of one of said resilient members, and each leg of the other pair being provided with overlapping tongues adapted to embrace another of said resilient members to connect said resilient members, the end portions of said resilient members being capable of being bent when the device is in use to positions where they embrace the peripheral face of a piston and being adapted to return to their original positions after the packing ring has been located on said piston.

In testimony that I claim the foregoing I hereunto affix my signature.

NELSON W. McLEOD.